(12) United States Patent
Thonangi et al.

(10) Patent No.: US 10,404,276 B1
(45) Date of Patent: Sep. 3, 2019

(54) STABLE VARIABLE-LENGTH ORDER-PRESERVING ENCODING SCHEME

(71) Applicant: Nicira, Inc., Palo Alto, CA (US)

(72) Inventors: Risi Thonangi, Palo Alto, CA (US); Harold Vinson C. Lim, Palo Alto, CA (US); Igor Ganichev, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 15/965,485

(22) Filed: Apr. 27, 2018

(51) Int. Cl.
    *H03M 7/40* (2006.01)
    *G06F 5/01* (2006.01)
    *G06F 7/74* (2006.01)

(52) U.S. Cl.
    CPC ............... *H03M 7/40* (2013.01); *G06F 5/01* (2013.01); *G06F 7/74* (2013.01)

(58) Field of Classification Search
    CPC .... H03M 7/40; H03M 7/4006; H03M 7/4012; H03M 7/4018; H03M 7/4037; H03M 7/4043; H03M 7/4093; G06F 5/01; G06F 7/74
    See application file for complete search history.

(56) References Cited

U.S. PATENT DOCUMENTS

| | | | | |
|---|---|---|---|---|
| 6,005,503 A | * | 12/1999 | Burrows | H03M 7/40 341/67 |
| 6,195,026 B1 | * | 2/2001 | Acharya | G06T 9/005 341/60 |
| 6,781,529 B1 | * | 8/2004 | Lin | H03M 7/42 341/106 |
| 7,609,000 B1 | * | 10/2009 | Sharma | H03M 7/40 314/67 |
| 8,836,548 B1 | * | 9/2014 | Chandra | H03M 7/607 341/60 |
| 10,171,104 B1 | * | 1/2019 | Lee | H03M 7/4031 |
| 2010/0085223 A1 | * | 4/2010 | Hendrickson | H03M 7/04 341/67 |
| 2012/0124113 A1 | * | 5/2012 | Zalik | H03M 7/3075 708/203 |
| 2012/0221540 A1 | * | 8/2012 | Rose | H03M 7/40 707/706 |
| 2015/0006857 A1 | * | 1/2015 | Kuo | H03M 7/14 712/208 |
| 2017/0054449 A1 | * | 2/2017 | Mani | H03M 7/4075 |
| 2018/0300606 A1 | * | 10/2018 | Corkery | G06N 3/10 |

* cited by examiner

*Primary Examiner* — Linh V Nguyen
(74) *Attorney, Agent, or Firm* — Fish & Richardson P.C.

(57) ABSTRACT

The present disclosure generally relates to an encoding scheme, and more specifically to a stable encoding scheme that is both variable-length and order-preserving. The present disclosure further describes a decoding scheme to decode and encoding generated by the encoding scheme. The encoding scheme may be parameterized by a single parameter k which remains constant across encoding and corresponding decoding operations. The output encodings generated by the encoding scheme are variable-length while maintaining order.

20 Claims, 4 Drawing Sheets

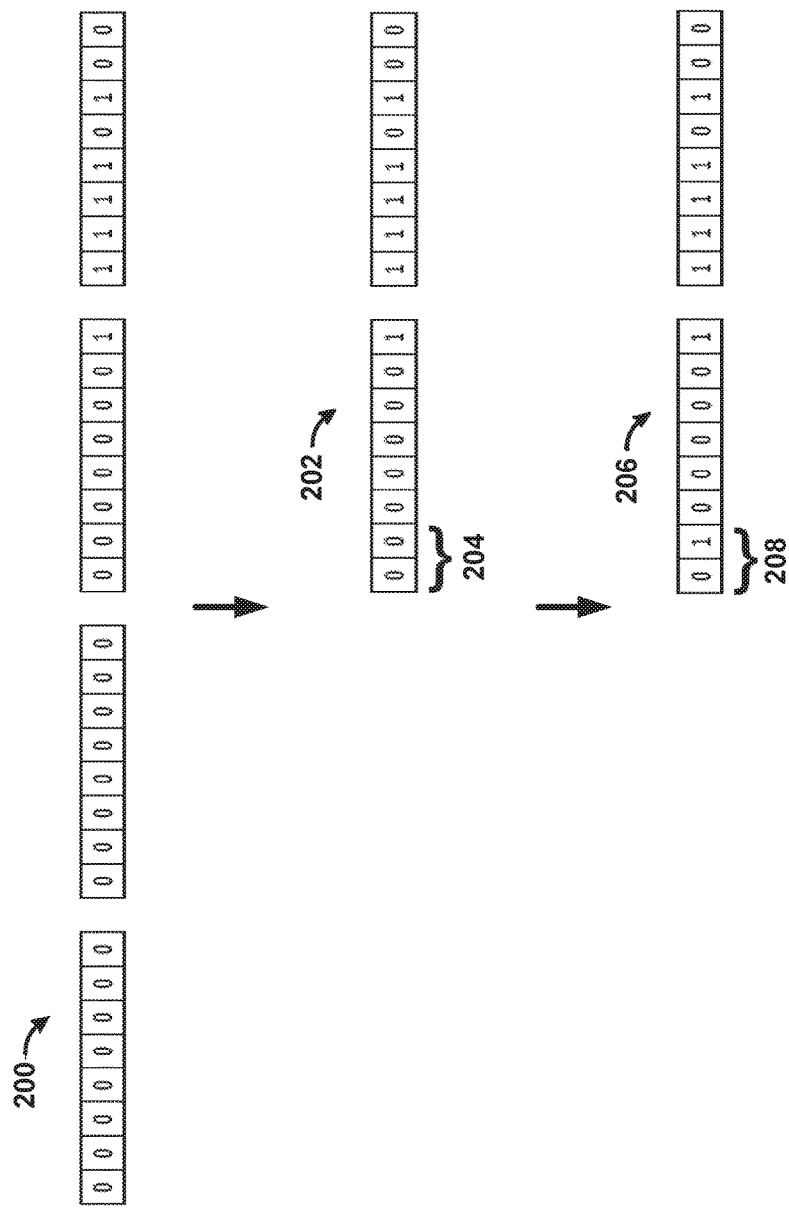

STABLE VARIABLE-LENGTH ORDER-PRESERVING ENCODING SCHEME

FIELD

The present disclosure relates generally to an encoding scheme, and more specifically to a stable encoding scheme that handles variable lengths and preserves order.

BACKGROUND

Computer systems commonly deploy databases that utilize a dictionary or hash data structure to manage underlying data. Such a database, commonly referred to as a key-value database or key-value store, stores a collection of records (e.g., objects), with each record corresponding to one or more different fields of data. The records are stored, managed, and retrieved from the key-value store using a key that uniquely identifies a corresponding record. Thus, keys are used to quickly locate data from the key-value store.

For example, a user may deal with a local database of a networking platform in transactions. A transaction can be a complex mixture of various operations such as Put, Delete, and Patch, and each transaction may be assigned a unique identifier, called a transaction-identifier, by the database. Transaction-identifiers are commonly assigned by making use of an incrementing integer counter. Thus, transaction-identifiers of older transactions have a smaller (integer) value than transaction-identifiers of newer transactions.

A local database may also store recent transaction history, which can be maintained in a rotating transaction log. That is, after completion of each transaction, the database can append a transaction log record to the rotating transaction log and, if the size of the rotating transaction log exceeds a specified space bound (of memory), some of the oldest log records are removed to ensure that the overall size of the log remains within the specified bound.

Such a transaction log is commonly implemented using a key-value store, with the keys set as the transaction-identifiers to ensure proper rotation of the log. However, depending on the size of the log, transaction-identifiers can become large in size, thereby requiring significant amounts of memory to maintain the key-value store. Further, during in-memory processing, CPUs generally store integer values in fixed width format so that operations (e.g., additions, multiplications) can easily be performed. However, fixed width format can lead to space wastage, in particular if a significant number of the integers corresponding to the transaction-identifiers are small in value. Further, storing large numbers of integers in fixed width format to a key-value store stored in a slower storage medium, such as an external storage disk (e.g., HDD, SSD), can be inefficient because the processing is performed in the CPU and not at the external storage medium—thus storing and retrieving keys and values between the CPU and the external storage medium using fixed width integer keys can be a slow and inefficient process.

To ameliorate this problem of wasted space, some existing variable-length integer encoding schemes use an arbitrary number of bytes to store the integers, where the average number of bytes required to encode an integer is smaller than the fixed-width size. However, the existing encoding schemes fail to be order-preserving. Therefore, existing encoding schemes cannot be implemented in databases that require the ordering of the records to be preserved, such as rotating transaction logs.

OVERVIEW

The invention disclosed herein is directed to a stable encoding scheme that is both variable-length and order-preserving. For example, the disclosed encoding scheme can be used to translate a transaction-identifier to a key in a key-value store such that the average size of the stored keys is smaller than a fixed-width integer size. As described in greater detail below, the disclosed encoding scheme utilizes an encoding algorithm that takes as input a value (e.g., an unsigned integer value) that needs to be encoded and returns as output the encoding (e.g., represented as character bytes) which may or may not have the same length as the input value (and thus is variable-length), but which maintains the respective ordering of the input value in the output encoding (and thus is order-preserving).

In some embodiments, one or more processors (e.g., of a computer system) performs a method to implement the disclosed stable encoding scheme. In some embodiments, the computer system includes the one or more processors and memory storing one or more programs configured to be executed by the one or more processors, where the one or more programs include instructions for performing the disclosed stable encoding scheme. In some embodiments, one or more programs that are stored in a non-transitory computer-readable storage medium and are configured to be executed by one or more processors of a computer system include instructions for performing the disclosed stable encoding scheme. In some embodiments, one or more programs that are stored in a transitory computer-readable storage medium and are configured to be executed by one or more processors of a computer system include instructions for performing the disclosed stable encoding scheme.

BRIEF DESCRIPTION OF THE DRAWINGS

The following description and associated figures teach the best mode of the inventions. Thus, those skilled in the art will appreciate variations from the best mode that fall within the scope of the inventions. Those skilled in the art will appreciate that the features described below can be combined in various ways to form multiple variations of the inventions. As a result, the inventions are not limited to the specific examples described below, but only by the claims and their equivalents.

FIGS. 2A-2B illustrate example inputs to the disclosed encoding scheme and corresponding outputs generated by the disclosed encoding scheme.

DETAILED DESCRIPTION

The invention disclosed herein is directed to an encoding scheme, and more specifically to a stable encoding scheme that is both variable-length and order-preserving. An encoding scheme is variable-length if an arbitrary number of bytes are used to encode a value or integer, where the average number of bytes required to encode the value/integer is smaller than the fixed-width size (e.g., typically 4 or 8 bytes).

Mathematically, an order-preserving encoding scheme is a scheme in which two integers x and y, where x<y (x is less than y), produce encodings E(x) and E(y) that can be treated as strings such that E(x)<E(y) (with "<" standing for "preceding" in dictionary order). For example, a key-value store can, instead of storing integers themselves directly as keys, store encodings of the integers obtained from the disclosed variable-length and order-preserving encoding scheme in an external memory index using dictionary order. Specifically, to service queries, a given query-window can be transformed into the encoded space and issued as a modified range query to the index. The encodings fetched by the range query can then be decoded and returned as output.

Figure 1A:
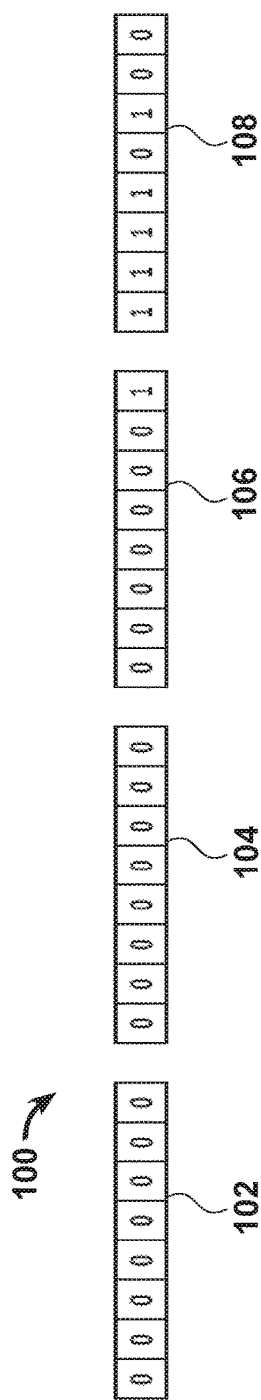
FIGS. 1A-1B illustrate example words of memory storing integers.

An (unsigned) integer taken as input in the disclosed encoding scheme is typically stored in a word of memory (e.g., of 4 or 8 bytes). FIG. 1A illustrates an example word of memory 100 comprising 4-bytes of memory that stores an unsigned integer value.

Word of memory 100 includes a first byte 102 corresponding to the most-significant byte of word of memory 100, a second byte 104 corresponding to the second most-significant byte of word of memory 100, a third byte 106 corresponding to the third most-significant byte of word of memory 100, and a fourth byte 108 corresponding to the least-significant byte of word of memory 100.

In FIG. 1A, word of memory 100 is storing an unsigned integer with value 500 (which equates to 111110100 in binary). The integer value (of 500) stored in word of memory 100 may correspond, for example, to a first transaction-identifier of a first transaction of a network platform.

Figure 1B:
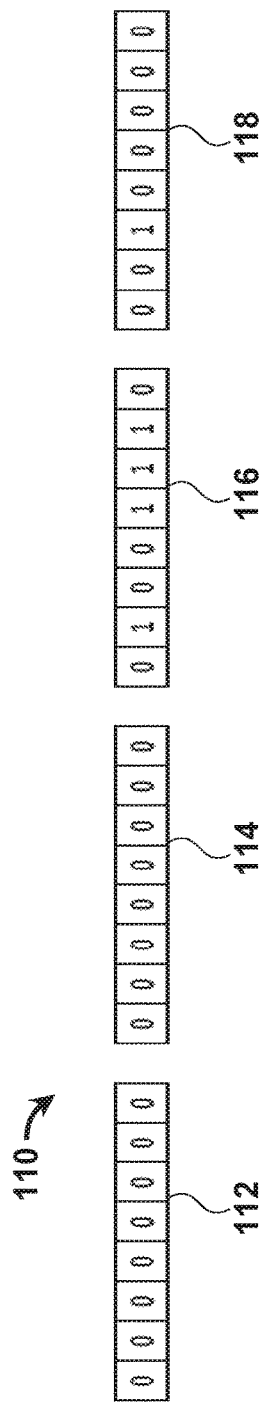

FIG. 1B illustrates another example word of memory 110 comprising four bytes of memory that stores a different (unsigned) integer value. Word of memory 110 includes a first byte 112 corresponding to the most-significant byte of word of memory 110, a second byte 114 corresponding to the second most-significant byte of word of memory 110, a third byte 116 corresponding to the third most-significant byte of word of memory 110, and a fourth byte 118 corresponding to the least-significant byte of word of memory 110.

In FIG. 1B, word of memory 110 is storing an unsigned integer with value 20000 (which equates to 100111000100000 in binary). The integer value (of 20000) stored in word of memory 110 may correspond, for example, to a second transaction-identifier of a second transaction of the network platform that occurred later (in time) than the first transaction.

The disclosed stable, variable-length, and order-preserving encoding scheme takes as input an (unsigned) integer (e.g., as a string) and outputs an output encoding (e.g., as a character array), where the ordering is preserved (that is, the ordering of the inputs and the ordering of the corresponding outputs remain the same). The disclosed encoding scheme is further parameterized with a single parameter k, and the encoding scheme may be denoted, for example, as $E_k$. As discussed in greater detail below, the value stored in the most-significant k number of bits in first (most-significant) byte of an output of $E_k$ corresponds to the total number of following bytes (i.e., the length of the remaining bytes) of that output.

In some embodiments, one or more processors of a computer system administer the following exemplary steps to implement the disclosed encoding scheme. Implementation of the encoding scheme can be characterized by an encoding algorithm defined as $E_k(V)$, where V is an (unsigned) integer input.

In some embodiments, the disclosed encoding scheme first defines an output encoding (e.g., initially as an empty string) in an output encoding variable (e.g., "C"), defines a length (initially set to 0) of the output encoding in a length variable (e.g., "L"), and sets a temporary character variable (e.g., "B"):

Step 1: C←⊥ (store the output encoding in an output encoding variable)
Step 2: L←0 (store the length of the output encoding in a length variable)
Step 3: B←0 (set a temporary character variable).

In some examples, Steps 1-3 are performed in a different order than the one listed above. In some examples, two or more of Steps 1-3 are performed simultaneously.

In some embodiments, the disclosed encoding scheme then performs a repeating loop (e.g., based on a Boolean condition, such as a while-loop) based on the following conditions:

Step 4: While V≠0: (perform a while-loop)
Step 4.1: B←V % 256 (fetch the least-significant byte of V into B)
Step 4.2: V←V/256 (remove the least-significant byte from V)
Step 4.3: C←(B)·C (concatenate the sequence)
Step 4.4: L←L+1 (update the length variable).

In Step 4, the disclosed encoding scheme generates a first version of the encoding. The first version of the encoding includes only bytes from the inputted word of memory that are required for the storage of the integer. A value to store in the most-significant k bits of the first (i.e., most-significant) byte of the first version of the encoding is determined and the storage is performed in the subsequent steps.

In some embodiments, the disclosed encoding scheme determines whether the value of the length variable (L) is zero, thereby checking whether the input V is 0 or empty. In some examples, if L=0, the scheme returns a null output encoding:

Step 5: If L=0, Return (C, L), where C=⊥ and L=0.

In some embodiments, the disclosed encoding scheme then determines whether the most-significant k bits of the most significant word of C are used to store the value (i.e., whether any of the most-significant k bits are set to 1).

If the most-significant k bits of the most significant word of C are not occupied (i.e., none of the most-significant k bits are set to 1), the encoding scheme stores the length of the encoding minus 1 (i.e., length of C−1) in the most-significant k bits of the most significant byte of C. In some embodiments, prior to storing the length of the encoding minus 1 in the most-significant k bits of the most significant byte of C, the disclosed encoding scheme further determines whether the value of the length variable (L) is greater than or equal to $2^k$, thereby checking whether the corner case of when L≥$2^k$. In some embodiments, if L≥$2^k$, the scheme either returns an error or outputs the default encoding (e.g., a null encoding):

Step 6: Else If C[0]<$2^{8-k}$
Step 6.1: If L≥$2^k$, Return an error; or
If L≥$2^k$, Return (C, L), where C and L are defaults
Step 6.2: C[0]←(L−1)*$2^{8-k}$+C[0] (store length of C−1 in the first byte).

Otherwise, if at least one of the most-significant k bits are occupied (i.e., at least one of the most-significant k bits are set to 1), the encoding scheme adds (concatenates) a new byte at the head of the encoding (thereby making the new byte the most significant bytes of C) in order to store the length of the encoding. In some embodiments, prior to adding the new byte at the head of the encoding in order to store the length of the encoding, the disclosed encoding scheme further determines whether the value of the length variable (L) is greater than or equal to $2^k$, thereby checking whether the corner case of when $L \geq 2^k$. In some embodiments, if $L \geq 2^k$, the scheme either returns an error or outputs the default encoding (e.g., a null encoding):

Step 7: Else
    Step 7.1: If $L \geq 2^k$, Return an error; or
    If $L \geq 2^k$, Return (C, L), where C and L are defaults
    Step 7.2: $B \leftarrow L * 2^{8-k}$ (store length of the code in a new byte)
    Step 7.3: $C \leftarrow (B) \cdot C$ (add new byte as most significant byte of encoding)
    Step 7.4: $L \leftarrow L+1$ (update the length variable).

In some embodiments, upon completion of the above steps, the disclosed encoding scheme outputs the generated output encoding (with the length variable):

Step 8: Return (C, L).

As mentioned, the disclosed encoding scheme ($E_k$) outlined above is order preserving. Two lemmas (Lemma 1 and Lemma 2) can be used to prove the order-preserving nature of the disclosed encoding scheme.

First, assume that Lemma 1 claims that if two integers x and y are such that x<y, then $E_k(x)$ has a non-greater number of bytes than $E_k(y)$. Lemma 1 can be proven by contradiction. Suppose $E_k(x)$ actually has more bytes than $E_k(y)$ despite the condition x<y. Then, this means either that: (1) the while-loop of $E_k$ in Step 4 ran more iterations for x than for y; or (2) the while-loop of $E_k$ in Step 4 ran an equal number of iterations for x and y, but C[0] of $E_k(x)$ has non-zero bits in its most significant k bits whereas C[0] of $E_k(y)$ does not have non-zero bits in its most significant k bits. The former is contradictory because the number of iterations that are run in the loop should be directly proportional to the input value, and thus the while-loop of $E_k$ in Step 4 should not have run more iterations for x than for y because the assumption under Lemma 1 is that x<y. The latter is also contradictory because such an occurrence would necessarily mean that x >y, yet the assumption under Lemma 1 is that x<y.

Second, assume that Lemma 2 claims that if two integers x and y such that x<y require the same number of bytes to encode, then $E_k(x) < E_k(y)$. Again, Lemma 2 can be proven by contradiction. More specifically, Lemma 2 can be proved by the contradiction of first assuming that $E_k(x) \not< E_k(y)$ despite the required condition if x<y, then proving this assumption to be false. Because $E_k$ is a deterministic algorithm, it can be safely established that $E_k(x) \neq E_k(y)$ because x≠y. Hence, the assumption must be that $E_k(x) > E_k(y)$. Lemma 2 is proven if this assumption is contradicted.

In this case, both encodings ($E_k(x)$ and $E_k(y)$) possess the same length. Thus, the most-significant k bits in both encodings have the same value. As such, the condition is failing at the remaining bits in the encodings. If b is assumed to be the bit position counting from the most-significant bit position in the encodings where the condition is failing, then: (a) $\forall b^+$, where $b^+ < b$, $E_k(x)[b^+]=0$ and $E_k(y)[b^+]=0$, and (b) $E_k(x)[b]=1$ and $E_k(y)[b]=0$. Only when conditions (a) and (b) are true will $E_k(x)$ come after $E_k(y)$ in dictionary order.

For both conditions (a) and (b) to be true, the following must be true: (1) the $b-k$th most-significant bit in x must be 1 whereas its value in y must be 0, and (2) more-significant bits than the $b-k$th most-significant bit must have 0's in both x and y. However, conditions (1) and (2) can both be true only when x>y. Yet, this is a contradiction. Therefore, if two integers x and y such that x<y require same number of bytes to encode, then $E_k(x) < E_k(y)$, as claimed by Lemma 2.

Based on Lemma 1 and Lemma 2, which have been proven above, it can then be further proven that $E_k$ is order-preserving—that is, if x<y, then $E_k(x) < E_k(y)$. From Lemma 1, it is known that $E_k(x)$ has a non-greater number of bytes than $E_k(y)$. Then, two different scenarios can arise, both of which leads to a conclusion that $E_k$ is order preserving.

In scenario (1), $E_k(x)$ has an equal number of bytes as $E_k(y)$. In this scenario, it is known from Lemma 2 that $E_k(x) < E_k(y)$. Therefore, if $E_k(x)$ has an equal number of bytes as $E_k(y)$, then $E_k(x) < E_k(y)$ if x<y; thus, $E_k$ is order preserving.

In scenario (2), $E_k(x)$ has a smaller number of bytes than $E_k(y)$. Then, the most-significant k bits in $E_k(x)$ must have a smaller value than the most-significant k bits in $E_k(y)$. This further means that $E_k(x)[0]$ must be smaller in value than $E_k(y)[0]$; as such, $E_k(x) < E_k(y)$. Therefore, if $E_k(x)$ has a smaller number of bytes than $E_k(y)$, then $E_k(x) < E_k(y)$ if x<y; thus, $E_k$ is order preserving.

FIG. 2A depicts an exemplary input 200 and a corresponding output 206 to $E_2(V)$ (that is, k=2), where input 200 is word of memory 100 from FIG. 1A storing an integer value of 500 (thus, V=500). As shown in FIG. 2A, $E_2(500)$ generates an output encoding 206 (e.g., as a character array) that corresponds to a binary form of 0100000111110100, stored in two bytes.

Under Steps 4-4.4, the technique determines that, of the four bytes in word of memory 100 storing the input value of 500, the two least-significant bytes (third and fourth bytes 106-108) store the value 500, and the remaining most-significant bytes (bytes 102-104) are not used to store the value 500 (and are thus empty/all-zero bytes). As such, Steps 4-4.4 result in a first version 202 of the encoding that includes only third and fourth bytes 106-108 of word of memory 100.

Then, under Steps 6-6.2 (because the most-significant k bits 204 of first version 202 of the encoding are not occupied), the technique stores a value corresponding to the length of the code minus 1 (i.e., length of C−1) in the k most-significant bits 204 which, in this example, corresponds to the value 1. Therefore, $E_2(500)$ generates an output encoding 206 of 01000001 11110100 (e.g., as a character array) stored in 2 bytes, with the first k most-significant bits 208 of output encoding 206 storing the length of the code minus 1 (value 1) and the remaining bits corresponding to the value of the input integer (value 500).

Figure 2B:
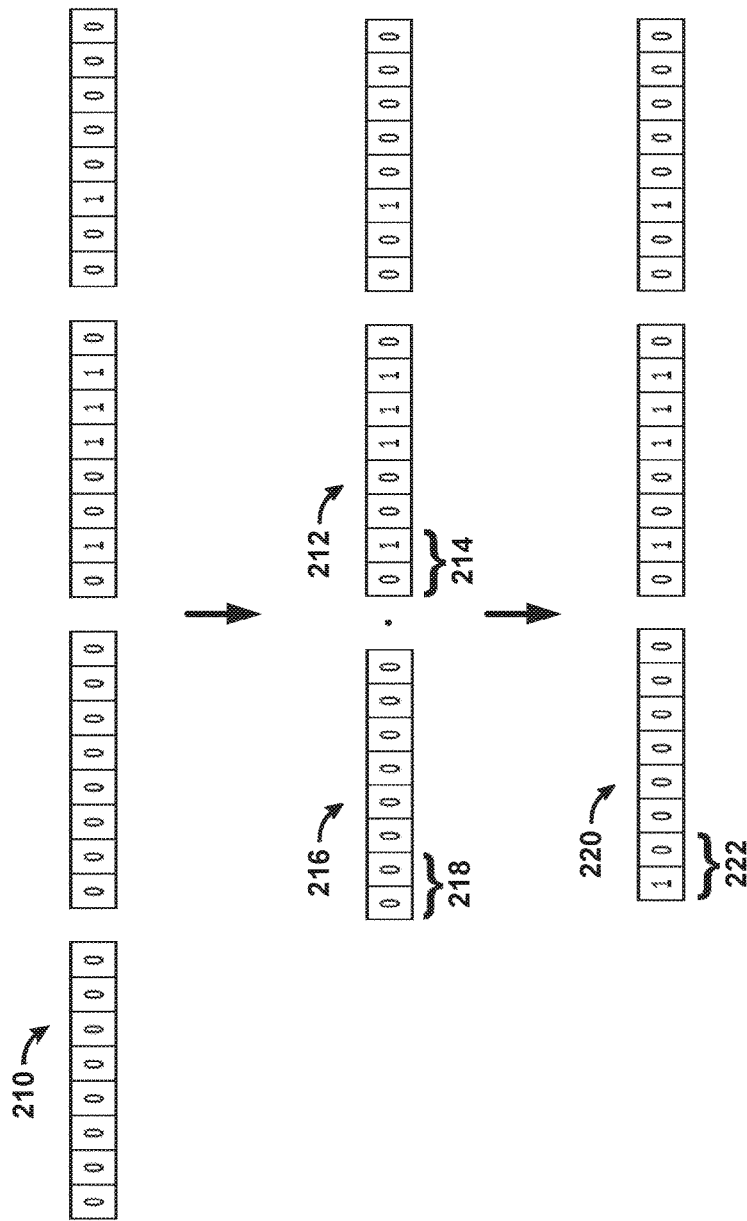

FIG. 2B depicts an exemplary input 210 and a corresponding output 220 to $E_2(V)$ (that is, k=2), where input 210 is word of memory 110 from FIG. 1B storing an integer value of 20000 (thus, V=20000). As shown in FIG. 2B, $E_2(20000)$ generates an output encoding 220 (e.g., as a character array) corresponds to a binary form of 100000000100111000100000, stored in three bytes.

Under Steps 4-4.4, $E_2(20000)$ determines that, of the 4-bytes in word of memory 110 storing the input value of 20000, the two least-significant bytes (third and fourth bytes 116-118) store the value 20000, and the remaining most-significant bytes (bytes 112-114) are not used to store the value 20000 (and are thus empty/all-zero bytes). As such, Steps 4-4.4 result in a first version 212 of the encoding that includes only third and fourth bytes 116-118 of word of memory 110.

Then, under Steps 7-7.4 (because the most-significant k bits 214 of first version 212 of the encoding are already occupied), $E_2(20000)$ stores a value corresponding to the length of the code in the k most-significant bits 218 of a new (empty) byte 216. In this example, the value stored in the k most-significant bits 218 corresponds to the value 2 (because the length of the code is 2 bytes). The new byte 216 is further added (e.g., concatenated) to the head of first version 212 of the encoding, thereby making the new byte 216 the most significant byte. Therefore, $E_2(2000)$ generates an output encoding 220 of 10000000 01001110 00100000 (e.g., as a character array) stored in three bytes, with the first k most-significant bits 222 of output encoding 220 storing the length of the code (value 2) and the remaining bits corresponding to the value of the input integer (value 20000).

When an encoding (e.g., utilized as a key) encoded by the disclosed encoding scheme is accessed (e.g., from a key-value store), the encoding can be decoded using a decoding scheme for $E_k$. The decoding scheme takes as input the character bytes storing the encoding and returns as output the (unsigned) integer value corresponding to the encoding.

In some embodiments, one or more processors of a computer system administer the following exemplary steps to implement an example decoding scheme. Implementation of the decoding scheme can be characterized by a decoding algorithm defined as $D_k(C)$, where C is a character array corresponding to an encoding (e.g., used as a key in a key-value store).

In some embodiments, the decoding scheme first defines an output variable V (e.g., initially set to 0) to store the integer value corresponding to the input encoding C:

Step 1: V←0 (store integer value corresponding to C in an output variable V).

In some embodiments, the decoding scheme then determines the length of the input encoding:

Step 2: L←C[0]>>(8−k) (compute the length of the input encoding).

In some embodiments, the decoding scheme then retrieves the value stored in the (8−k) least-significant bits of C[0] into the answer variable V by first left-shifting the value in C[0] by k bits (thereby removing the length of the code from C[0]), then right-shifting the resultant value by k bits to fill those k most-significant bit positions with 0's:

Step 3: V←(C[0]<<k)>>k (retrieve the value stored in least-significant (8−k) bits in C[0]).

In some embodiments, the decoding scheme then accumulates the value stored in the rest of the code into V using a repeating loop (e.g., a for-loop):

Step 4: For i=1 to L:
Step 4.1: V←V*256+C[i].

In this for-loop, L loops and an additional loop is processed to compute the value stored in C[0] from Step 3.

In some embodiments, the decoding scheme then outputs the integer value V corresponding to the input encoding:

Step 5: Return(V).

As such, in some embodiments, the $D_k(C)$ requires L steps to decode a given input encoding, where L is the length of the input encoding.

As shown above, in some embodiments, encoding algorithm $E_k(V)$ outputs the length of the encoding, whereas decoding algorithm $D_k(C)$ does not separately require the length of the input encoding as input. This is because the length of the input encoding is stored as part of the code, and thus $D_k(C)$ can obtain the value of the length from the code itself (e.g., from Step 1, where $D_k(C)$ accesses C[0] to read the length of the encoding).

Further, in some embodiments, $D_k(C)$ assumes that the encoding is at least 1 byte in size. In such embodiments, if the encoding is 0 bytes in size, the decoding scheme can keep track of (or allow a user to keep track of) the length and invoke the decoding algorithm only when the length of the input encoding is non-zero.

In some embodiments, other decoding schemes are used to generate an output integer from an input encoding. For example, another example decoding scheme determines the k most-significant bits of an input encoding and re-sets those bits to 0's to generate an output that corresponds to the integer value.

Figure 3:
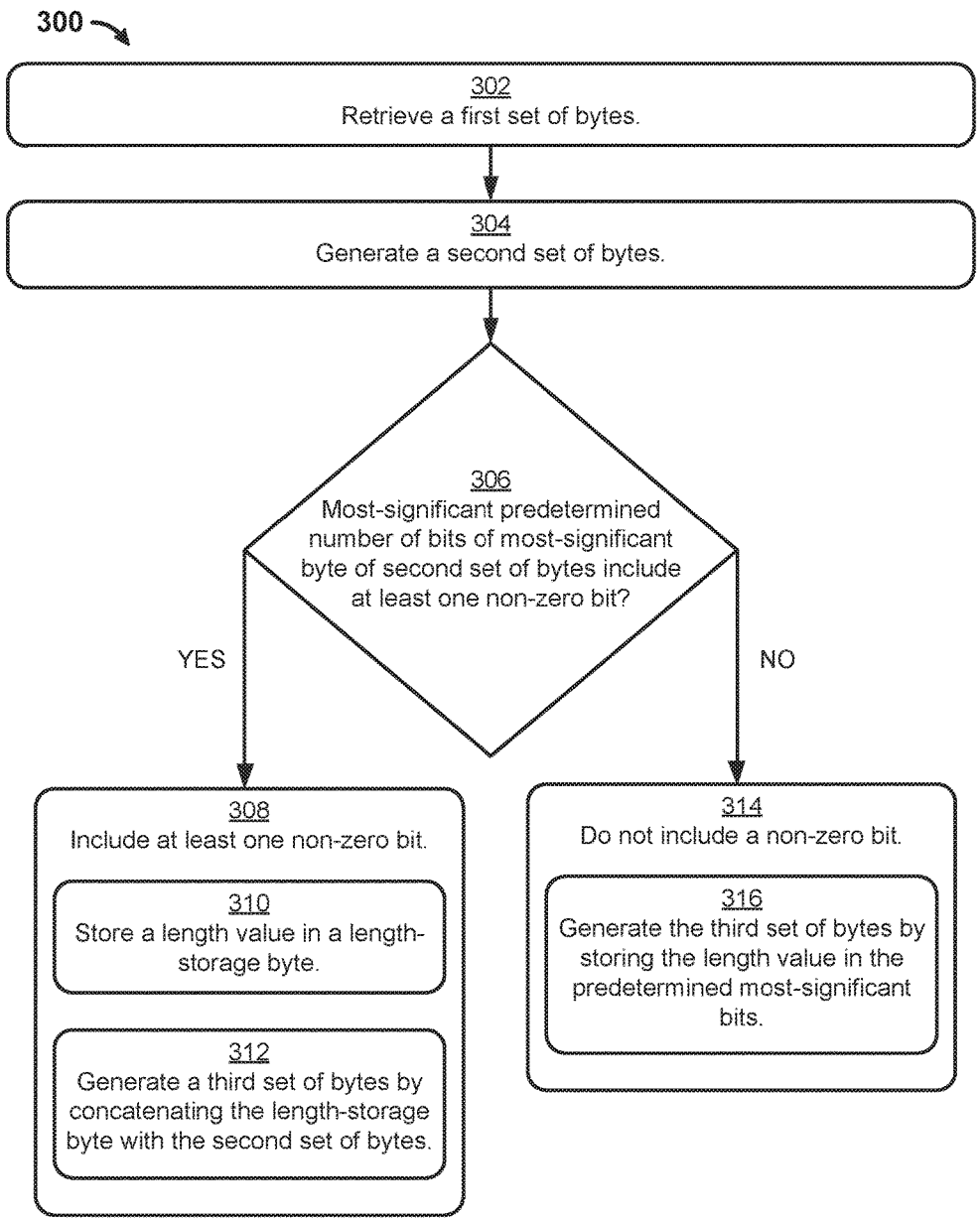
FIG. 3 is a flow diagram illustrating steps of the disclosed enclosing scheme, in accordance with some embodiments.

FIG. 3 is a flow diagram 300 illustrating the disclosed stable, variable-length, and order-preserving encoding scheme ($E_k$), in accordance with some embodiments. The various blocks are implemented by one or more processors of a computer system. The one or more processors are connected to memory, which one or more programs that include instructions for performing the technique.

At block 302, the one or more processors retrieve (e.g., from memory) a first set of bytes that stores a value (e.g., of an unsigned integer). In some embodiments, the value corresponds to a transaction-identifier of a transaction (e.g., of a networking platform). In some embodiments, the first set of bytes that stores the value corresponds to a word of memory (e.g., 4-byte or 8-byte word of memory).

At block 304, the one or more processors select a subset of the first set of bytes to generate a second set of bytes by identifying, in the first set of bytes, the most-significant non-zero byte and any bytes that are less significant than the identified most-significant non-zero byte. In some embodiments, if the most-significant non-zero byte is the only byte in the first set of bytes, there are no bytes that are less significant than the identified most-significant non-zero byte.

In some embodiments, to select the subset of the first set of bytes to generate a second set of bytes by identifying, in the first set of bytes, the most-significant non-zero byte and bytes that are less significant than the identified most-significant non-zero byte, the one or more processors sequentially select and remove, from the first set of bytes, the least-significant byte until the first set of bytes no longer includes a non-zero byte. In some embodiments, the one or more processors further form the second set of bytes by concatenating the bytes selected and removed from the first set of bytes, wherein the ordering of each byte in the second set of bytes corresponds to the previous ordering of each respective byte in the first set of bytes. In some embodiments, sequentially selecting, from the first set of bytes, the least-significant byte comprises dividing the first set of bytes by an integer value of 256. In some embodiments, the technique simply drops the most significant bytes that are zero to generate the second set of bytes.

At block 306, the one or more processors determine whether a most-significant predetermined number (e.g., k) of bits of the most-significant byte of the second set of bytes include at least one non-zero bit.

At block 308, in accordance with a determination that a most-significant predetermined number (e.g., k) of bits of the most-significant byte of the second set of bytes include at least one non-zero bit, the one or more processors, at block 310, store a length value in a length-storage byte (e.g., in the most-significant predetermined number (e.g., k) of bits of the length-storage byte), the length value corresponding to (e.g., being equal to) the number of bytes of the second set of bytes. Thus, the bits other than the most-significant predetermined number (e.g., k) bits of the length-storage byte are zero bits. At block 312, the one or more processors generate a third set of bytes by concatenating the length-storage byte with the second set of bytes, such that the length-storage byte is the most-significant byte of the third set of bytes (that is, the third set of bytes have one more byte than the second set of bytes). In some embodiments, the predetermined number is two (i.e., k=2). In some embodiments, the predetermined number is three (i.e., k=3).

At block 314, in accordance with a determination that the most-significant predetermined number (e.g., k) of bits of the most-significant byte of the second set of bytes do not include a non-zero bit, the one or more processors, at block 316, generate the third set of bytes by storing the length value in the most-significant predetermined number of bits of the most-significant byte of the second set of bytes, the length value corresponding to (e.g., being equal to) one less than the number of bytes of the second set of bytes (that is, the third set of bytes have the same number of bytes as the second set of bytes).

In some embodiments, the value stored in the first set of bytes has a position in an ordered list of input values, and a value stored in the third set of bytes has a corresponding position in a corresponding ordered list of output values; therefore, the order of the values is preserved.

In some embodiments, subsequent to generating the third set of bytes, the one or more processors store the third set of bytes as an encoded key of a key-value store, such as in a database.

In some embodiments, the one or more processors retrieve an encoded key from the key-value store, the encoded key comprising a plurality of bits. In some embodiments, the one or more processors then left-shift the plurality of bits of the encoded key by the predetermined number of bits. In some embodiments, the one or more processors then right-shift the plurality of bits of the encoded key by the predetermined number of bits to produce a decoded key. In some embodiments, the one or more processors then output the decoded key.

In some embodiments, the one or more processors retrieve an encoded key from the key-value store, the encoded key comprising a plurality of bits. In some embodiments, the one or more processors then store a zero value in each of the first predetermined number of bits of the plurality of bits of the encoded key to produce a modified encoded key. In some embodiments, the one or more processors then output a decoded key, the decoded key corresponding to the modified encoded key.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations.

What is claimed is:

1. A method, comprising:
at one or more processors:
retrieving a first set of bytes that stores a value;
selecting a subset of the first set of bytes to generate a second set of bytes by identifying, in the first set of bytes, the most-significant non-zero byte and any bytes that are less significant than the identified most-significant non-zero byte;
determining whether a most-significant predetermined number of bits of the most-significant byte of the second set of bytes include at least one non-zero bit;
in accordance with a determination that the most-significant predetermined number of bits of the most-significant byte of the second set of bytes include at least one non-zero bit:
storing a length value in a length-storage byte, the length value corresponding to the number of bytes of the second set of bytes; and
generating a third set of bytes by concatenating the length-storage byte with the second set of bytes, such that the length-storage byte is the most-significant byte of the third set of bytes; and
in accordance with a determination that the most-significant predetermined number of bits of the most-significant byte of the second set of bytes do not include a non-zero bit:
generating the third set of bytes by storing the length value in the most-significant predetermined number of bits of the most-significant byte of the second set of bytes, the length value corresponding to one less than the number of bytes of the second set of bytes.

2. The method of claim 1, wherein selecting the subset of the first set of bytes to generate a second set of bytes by identifying, in the first set of bytes, the most-significant non-zero byte and bytes that are less significant than the identified most-significant non-zero byte comprises:
sequentially selecting and removing, from the first set of bytes, the least-significant byte until the first set of bytes no longer includes a non-zero byte; and
forming the second set of bytes by concatenating the bytes selected and removed from the first set of bytes, wherein the ordering of each byte in the second set of bytes corresponds to the previous ordering of each respective byte in the first set of bytes.

3. The method of claim 2, wherein sequentially selecting, from the first set of bytes, the least-significant byte comprises dividing the first set of bytes by an integer value of 256.

4. The method of claim 1, further comprising:
subsequent to generating the third set of bytes, storing the third set of bytes as an encoded key of a key-value store.

5. The method of claim 4, further comprising:
retrieving an encoded key from the key-value store, the encoded key comprising a plurality of bits;
left-shifting the plurality of bits of the encoded key by the predetermined number of bits;
subsequent to the left-shifting, right-shifting the plurality of bits of the encoded key by the predetermined number of bits to produce a decoded key; and
outputting the decoded key.

6. The method of claim 1, wherein the value stored in the first set of bytes has a position in an ordered list of input values, and a value stored in the third set of bytes has a corresponding position in a corresponding ordered list of output values.

7. The method of claim 1, wherein the first set of bytes that stores the value corresponds to a word of memory storing an unsigned integer.

8. The method of claim 1, wherein the value corresponds to a transaction-identifier of a transaction.

9. A non-transitory computer-readable storage medium storing one or more programs configured to be executed by one or more processors, the one or more programs including instructions for:
retrieving a first set of bytes that stores a value;
selecting a subset of the first set of bytes to generate a second set of bytes by identifying, in the first set of bytes, the most-significant non-zero byte and any bytes that are less significant than the identified most-significant non-zero byte;
determining whether a most-significant predetermined number of bits of the most-significant byte of the second set of bytes include at least one non-zero bit;

in accordance with a determination that a most-significant predetermined number of bits of the most-significant byte of the second set of bytes include at least one non-zero bit:
  storing a length value in a length-storage byte, the length value corresponding to the number of bytes of the second set of bytes; and
  generating a third set of bytes by concatenating the length-storage byte with the second set of bytes, such that the length-storage byte is the most-significant byte of the third set of bytes; and
in accordance with a determination that the most-significant predetermined number of bits of the most-significant byte of the second set of bytes do not include a non-zero bit: generating the third set of bytes by storing the length value in the most-significant predetermined number of bits of the most-significant byte of the second set of bytes, the length value corresponding to one less than the number of bytes of the second set of bytes.

10. The non-transitory computer-readable storage medium of claim 9, wherein selecting the subset of the first set of bytes to generate a second set of bytes by identifying, in the first set of bytes, the most-significant non-zero byte and bytes that are less significant than the identified most-significant non-zero byte comprises:
  sequentially selecting and removing, from the first set of bytes, the least-significant byte until the first set of bytes no longer includes a non-zero byte; and
  forming the second set of bytes by concatenating the bytes selected and removed from the first set of bytes, wherein the ordering of each byte in the second set of bytes corresponds to the previous ordering of each respective byte in the first set of bytes.

11. The non-transitory computer-readable storage medium of claim 10, wherein sequentially selecting, from the first set of bytes, the least-significant byte comprises dividing the first set of bytes by an integer value of 256.

12. The non-transitory computer-readable storage medium of claim 9, wherein the one or more programs further include instructions for:
  subsequent to generating the third set of bytes, storing the third set of bytes as an encoded key of a key-value store.

13. The non-transitory computer-readable storage medium of claim 12, wherein the one or more programs further include instructions for:
  retrieving an encoded key from the key-value store, the encoded key comprising a plurality of bits;
  left-shifting the plurality of bits of the encoded key by the predetermined number of bits;
  subsequent to the left-shifting, right-shifting the plurality of bits of the encoded key by the predetermined number of bits to produce a decoded key; and
  outputting the decoded key.

14. The non-transitory computer-readable storage medium of claim 9, wherein the value stored in the first set of bytes has a position in an ordered list of input values, and a value stored in the third set of bytes has a corresponding position in a corresponding ordered list of output values.

15. A computer system having one or more processors and memory storing one or more programs configured to be executed by the one or more processors, the one or more programs including instructions for:
  retrieving a first set of bytes that stores a value;
  selecting a subset of the first set of bytes to generate a second set of bytes by identifying, in the first set of bytes, the most-significant non-zero byte and any bytes that are less significant than the identified most-significant non-zero byte;
  determining whether a most-significant predetermined number of bits of the most-significant byte of the second set of bytes include at least one non-zero bit;
  in accordance with a determination that a most-significant predetermined number of bits of the most-significant byte of the second set of bytes include at least one non-zero bit:
    storing a length value in a length-storage byte, the length value corresponding to the number of bytes of the second set of bytes; and
    generating a third set of bytes by concatenating the length-storage byte with the second set of bytes, such that the length-storage byte is the most-significant byte of the third set of bytes; and
  in accordance with a determination that the most-significant predetermined number of bits of the most-significant byte of the second set of bytes do not include a non-zero bit: generating the third set of bytes by storing the length value in the most-significant predetermined number of bits of the most-significant byte of the second set of bytes, the length value corresponding to one less than the number of bytes of the second set of bytes.

16. The computer system of claim 15, wherein selecting the subset of the first set of bytes to generate a second set of bytes by identifying, in the first set of bytes, the most-significant non-zero byte and bytes that are less significant than the identified most-significant non-zero byte comprises:
  sequentially selecting and removing, from the first set of bytes, the least-significant byte until the first set of bytes no longer includes a non-zero byte; and
  forming the second set of bytes by concatenating the bytes selected and removed from the first set of bytes, wherein the ordering of each byte in the second set of bytes corresponds to the previous ordering of each respective byte in the first set of bytes.

17. The computer system of claim 16, wherein sequentially selecting, from the first set of bytes, the least-significant byte comprises dividing the first set of bytes by an integer value of 256.

18. The computer system of claim 15, wherein the one or more programs further include instructions for:
  subsequent to generating the third set of bytes, storing the third set of bytes as an encoded key of a key-value store.

19. The computer system of claim 18, wherein the one or more programs further include instructions for:
  retrieving an encoded key from the key-value store, the encoded key comprising a plurality of bits;
  left-shifting the plurality of bits of the encoded key by the predetermined number of bits;
  subsequent to the left-shifting, right-shifting the plurality of bits of the encoded key by the predetermined number of bits to produce a decoded key; and
  outputting the decoded key.

20. The computer system of claim 15, wherein the value stored in the first set of bytes has a position in an ordered list of input values, and a value stored in the third set of bytes has a corresponding position in a corresponding ordered list of output values.

* * * * *